May 7, 1963 G. T. SAUNDERS 3,088,627
WINDOW SEALING STRUCTURE
Filed March 8, 1961
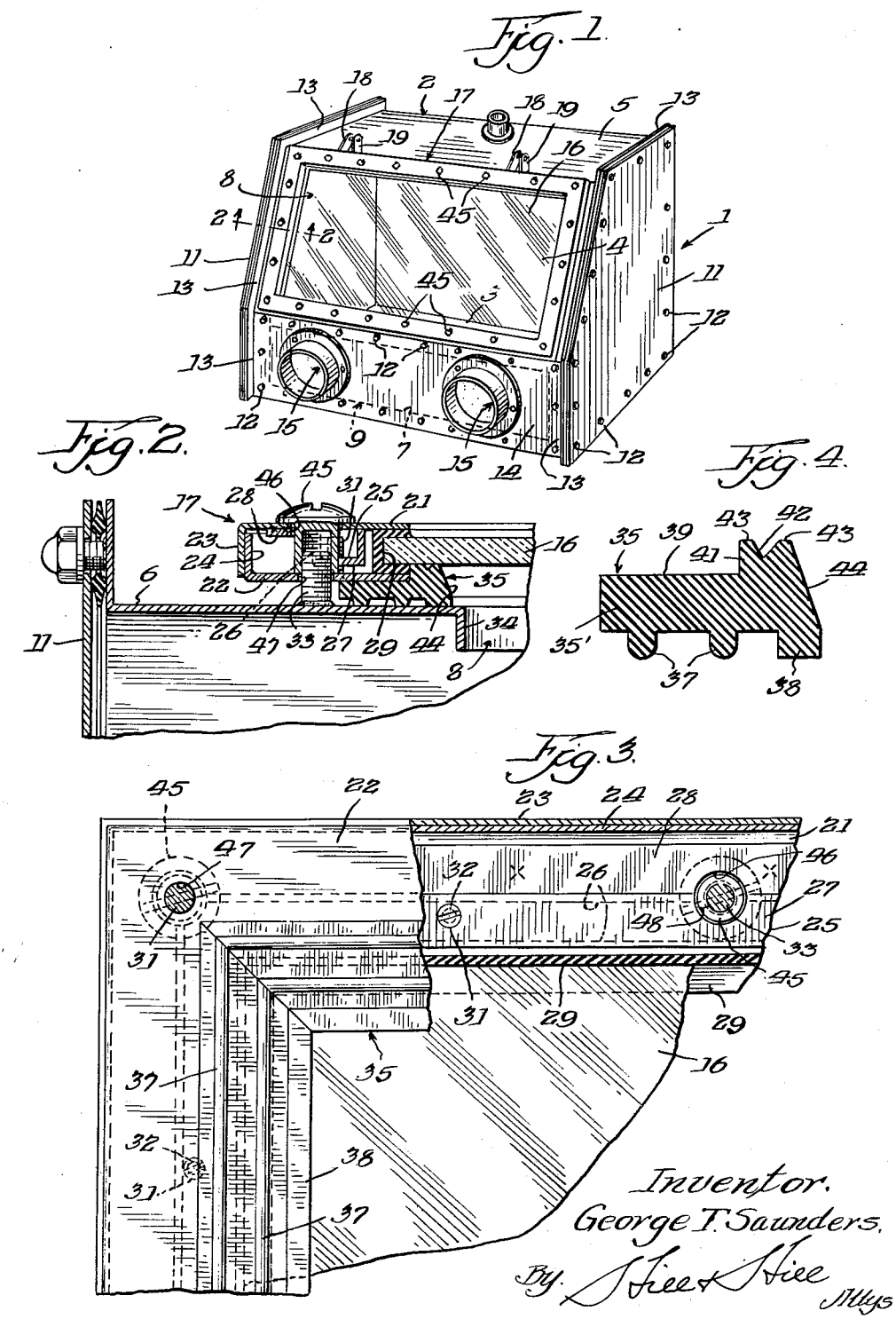
Inventor.
George T. Saunders.
By. Hill & Hill
Attys

United States Patent Office 3,088,627
Patented May 7, 1963

3,088,627
WINDOW SEALING STRUCTURE
George T. Saunders, Adrian, Mich., assignor to Kewaunee Manufacturing Company, Adrian, Mich., a corporation of Michigan
Filed Mar. 8, 1961, Ser. No. 94,331
8 Claims. (Cl. 220—82)

The invention relates generally to sealed enclosure structures and more particularly to an improved construction for sealing a transparent window in such an enclosure.

The invention is of particular use in connection with laboratory glove boxes and the like, wherein a sterile condition is maintained, or a controlled atmosphere is maintained therein in connection with the handling and processing of materials which are subject to contamination or the like.

In the past, window units for enclosures of the type above referred to have involved a transparent pane of glass or other suitable material which is mounted in a suitable sash frame, usually metallic, a suitable gasket being positioned between the edges of the pane and the adjacent frame structure, whereby such pane edges are enclosed within the latter, the sash frame being sealed with respect to the enclosure on which it is mounted by another gasket disposed between opposite faces of the enclosure and the sash frame. Such a construction involves two gasket members, either one of which may be subject to leaks and as such gasket members are normally concealed, leaks and the like are not readily determinable, particularly visually.

The present invention has among its objects the production of a sealing structure of the type involved employing a single gasket member which is disposed directly between the opposed edge portions of the inner surface of the pane and the adjacent face of the enclosure.

Another object of the invention is the production of a sealing structure in which the sealing gasket is provided with a plurality of sealing elements adapted to engage the surfaces involved so that each surface in engagement with the gasket is sealed along a plurality of lines rather than only one, thereby providing a high degree of protection from leakage and enabling utilization of the gasket on surfaces which have not been provided with machined interfaces, effecting a positive seal which will readily withstand maximum pressures employed in structures of the type involved.

A further object of the invention is the production of such a sealing structure which is so designed that the seal between the winding pane and the gasket member is viewable from the exterior of the structure so that the seal is visually ascertainable.

A further object of the invention is the production of such a sealing structure wherein the sash frame member may be constructed from several sheet metal elements and at the same time possess adequate inherent rigidity to insure the substantially uniform compression of the gasket member and thus efficient sealing action by the gasket member.

A further object of the invention is the production of such a sealing structure, which is extremely simple in construction, efficient in operation and relatively inexpensive to manufacture.

Many other objects and advantages of the construction herein shown and described will be obvious to those skilled in the art from the disclosure herein given.

In the drawings, wherein like reference characters indicate like or corresponding parts:

FIG. 1 is a perspective view of an enclosure constructed in accordance with the present invention;

FIG. 2 is a sectional view through a portion of the enclosure structure taken approximately on the line 2—2 of FIG. 1;

FIG. 3 is an inner or bottom plan view of the window frame structure with portions thereof broken away to disclose the details of construction; and FIG. 4 is a transverse sectional view through the unmounted gasket.

Referring to the drawings, the reference numeral 1 indicates generally an enclosure such as a glove box or the like, having a body structure indicated generally by the numeral 2 and comprising a bottom 3, rear wall 4, top wall 5, an inclined front wall 6 and the vertical front wall 7, such walls being suitably fabricated out of one or more pieces of sheet material and suitably joined together, the front walls 6 and 7 being provided with openings 8 and 9 therein.

The ends of the enclosure are closed by suitable end walls 11 which may be secured to the structure 2 by suitable cap nuts 12 which are threaded on studs carried by the structure 2, the particular construction illustrated employing outwardly directed flanges 13 on the structure 2, to which flanges the end walls are secured as described. In like manner the opening 9 may be closed by a suitable panel 14 which is provided with a pair of flanged glove openings 15, which may be constructed in the same manner as prior devices, the panel 14 being secured to the wall 7 by cap nuts 12 which likewise are secured to studs which are carried by said front wall and extend through the panel.

The opening 8 is adapted to be sealed by a transparent pane 16 of glass or other suitable material which is carried by suitable sash frame 17 which may be pivotally carried by the structure 2 through a hinge element 18 carried by the sash 17 which in turn is pivotally connected to a stationary hinge member 19 mounted on the top 5 of the enclosure.

As illustrated in FIGS. 2 and 3, the sash frame 17 is constructed in two sections 21 and 22, respectively forming the inner and outer faces of the sash member and provided with peripheral end walls 23 and 24.

Secured to the inner face of the outer member 21 is a reinforcing channel member 25 which is provided with a generally U-shaped portion comprising oppositely disposed legs 26 which are connected by an intermediate portion 27, one of the legs 26 terminating at its outer edge in an outwardly directed flange 28. The channel 25 may be secured to the member 21 by any suitable means, as for example, welding or the like. The pane 16 is disposed with its peripheral edges interposed between the adjacent portions of the members 21 and 22, the edge of the glass preferably being protected by a layer and/or peripheral U-shaped gasket 29 of suitable material, as for example, rubber or the like. The member 22 is connected to the member 21 by suitable means such as screws 31 which extend through the face of the member 22 and received in threaded bores 32 in the channel member 25, thereby also firmly clamping the pane 16 in the sash member.

The sash frame 17 is adapted to be secured to the wall 6 of the enclosure by suitable means such as studs 33, welded or otherwise secured to the adjacent front face 6, which as illustrated in FIG. 2, is provided with an inwardly directed flange 34 defining the window opening 8 in the wall 6. Interposed between the sash frame 17 and the adjacent front wall 6 is an annular gasket member indicated generally by the numeral 35, constructed of a synthetic rubber-like material or other suitable material which generally corresponds in configuration to that of the sash frame 17 and of uniform transverse cross section as illustrated in FIG. 4.

The gasket member 35 comprises a generally rectangular shaped body portion 35' provided at its bottom face with three ribs, two ribs 37 being generally cylindrically shaped adjacent their outer edges, while the rearmost rib 38, is generally rectangular in cross section. Extending upwardly or outwardly from the opposite face 39 of the gasket member is a projection 41 which is provided with a generally V-shaped groove 42 therein driving the outer portion of the projection 41 into two longitudinally extending beads or ribs 43, the adjacent inner edge of the gasket member being beveled as indicated at 44.

As will be apparent from a reference to FIG. 2, the gasket member is disposed between the wall 6 and sash frame 17, the face 39 of the gasket member bearing on the outer surface of the member 22 and the adjacent longitudinal edge of the projection 41 abutting the inner edge of the member 22, the beads 42 in engagement with the pane 16, and the ribs 37 and 38 in engagement with the outer surface of the wall 6. To facilitate the installation and opening of the sash when desired, the face 39 of the gasket preferably is cemented to the adjacent surface of the sash member 22.

The sash is operatively secured to the enclosure by suitable means such as sleeve nuts 45, provided with internally threaded bores adapted to receive the studs 33, the sash member 21 having openings 46 therein of a size to receive the sleeve nut and the member 22 having openings 47 therein of a size to receive the studs 33. It will be noted that the sleeve nuts 45 are of a length to seat on the inner face of the member 22, thus in effect forming a spacer therefor so that as the sleeve nuts are drawn down in the studs such nuts will urge not only the member 21 toward the wall 6 but also the member 22. Compression forces are thus directly applied to the gasket member 35 through the sleeve nut and the member 22, and through the member 21 and pane 16. The channel member 25 in addition to providing a stop for the end edges of the pane 16, also functions as a reinforcing member for the sash member 21 and it will be noted that the leg 26, carrying the flange 28, is disposed substantially in longitudinal alignment with the axes of the sleeve nuts 45, thereby providing a transversely extending reinforcing member in direct line with the forces applied to the sash member. Thus it will be noted from a reference to FIG. 3 that the openings 46 intersect such wall of the channel member which is cut away, as indicated at 48, to provide clearance for the sleeve nuts 45.

It will be particularly noted from a reference to FIG. 2 that the gasket member 35 provides three effective sealing ribs 37 and 38 between the wall 6 and the gasket member, and two ribs 43 between the gasket member and the pane 16, thereby providing a very efficient seal between the pane and the enclosure, which seal is highly effective even though the wall 6 is formed as a sheet metal structure without accurate machining or the like between the interfaces of the wall 6 and the sash frame. Likewise it will be noted that the strip 29 functions primarily as a cushioning member on the edges of the pane 16 and tends to distribute the compression forces evenly along the edges of the pane, compensating for any minor irregularities in the adjacent faces of the members 21 and 22.

It will be particularly noted that the seal between the pane 16 and the gasket member 35 is visible at all times through the pane as the ribs 43 are disposed inwardly from the adjacent edges of the sash member 17 and in like manner the adjacent edge of the rib 38 is also visible through the pane 16 so that the user has a visual indication of the sealing action, particularly between the gasket member and the pane 16.

In the event of breakage of the pane 16, the sash member may be readily disconnected from the front wall 6, following which the two sections of the sash member may be disassembled, thereby facilitating replacement of the pane.

Having thus described my invention, it will be obvious to those skilled in the art from the disclosure herein given that various immaterial modifications may be made in the same without departing from the spirit of my invention; hence I do not wish to be understood as limiting myself to the exact form, construction, arrangement and combination of parts herein shown and described or uses mentioned.

I claim:

1. The combination with a laboratory glove box including a wall member provided with a window opening therein, of a window sealing structure for the window opening, said window sealing structure including a window pane of a size to overlie the marginal portion of said wall member defining said window opening, a peripheral U-shaped gasket enclosing the peripheral edge of the window pane, a sash frame including detachably mounted and complementally formed L-shaped inner and outer peripherally shaped sections of a size to receive the peripheral edge of said window pane encased in said U-shaped gasket and overlie the marginal portions of the window pane, complementally formed detachable securing means for affixing the sash frame to the marginal portion of the wall member defining said window opening, said wall member having a relatively smooth outer face surrounding the window opening therein, said complementally formed detachable securing means for drawing the sash frame toward the wall member, and an annularly shaped gasket member disposed between the latter and the sash frame, said annularly shaped gasket member adapted for affixing to said sash frame and being generally L-shaped in transverse cross-section including a leg comprising a substantially rectangular shaped body portion, said rectangular shaped body portion disposed between and adapted to be compressed by the sash frame and wall member, the other leg of said angularly shaped gasket member including an outwardly extending annular projection providing an outer portion, said outer portion being disposed in engagement with and upon compression forming a seal directly between the inner face of the window pane and the marginal face portion of said wall member defining said window opening, and the outer face of the rectangular shaped body portion abutting the inner face of the L-shaped inner peripheral section and the inner peripheral edge of the L-shaped inner peripheral section and inner edge of a leg of the peripheral U-shaped gasket abutting the contiguous face of the L-shaped inner peripheral section complementally formed to and abutting the peripheral vertical edge of the outwardly extending annular projection.

2. The combination with a laboratory glove box including a wall member provided with a window opening therein, of a window sealing structure for the window opening, said window sealing structure including a window pane of a size to overlie the marginal portions of said wall member defining said window opening, a peripheral U-shaped gasket enclosing the peripheral edge of the window pane, a sash frame including detachably mounted and complementally formed L-shaped inner and outer peripherally shaped sections of a size to receive the peripheral edge of said window pane encased in said U-shaped gasket and overlie the marginal portions of the outer face of the window pane, complementally formed detachable securing means for affixing the sash frame to the marginal portions of the wall member defining said window opening, said wall member having a relatively smooth outer face surrounding the window opening therein, said complementally formed detachable securing means for drawing the sash frame toward the wall member, and an annularly shaped gasket member disposed between the wall member and the sash frame, said annularly shaped gasket member adapted for affixing to said sash frame and being generally L-shaped in transverse cross-section including a leg comprising a substantially rectangular-shaped body portion, said rectangular-shaped body portion disposed between and adapted to be compressed by the sash frame and wall member, the other leg of said annularly shaped gasket member including an outwardly extending annular projection providing an outer portion, said outer portion being disposed in engagement with and upon compression forming a seal directly between the inner face of the window pane and the marginal face portions of said wall member defining said window opening, the outer face of the rectangular-shaped body portion abutting the inner face of the L-shaped inner peripheral section and the inner peripheral edge of the L-shaped inner peripheral section and the inner edge of a leg of the peripheral U-shaped gasket abutting the contiguous face of the L-shaped inner peripheral section complementally formed to and abutting the peripheral vertical edge of the outwardly extending annular projection, and said outer portion of said outwardly extending annular projection disposed laterally inwardly, whereby engagement of the outer portion of said annularly shaped gasket member with the pane is disposed laterally inwardly with respect to the sash frame whereby the seal thus formed is visible through the pane.

3. A window sealing structure for a laboratory glove box comprising a wall member provided with a window opening therein, said window sealing structure including a window pane of a size to overlie the marginal portions of said wall member defining said window opening, a peripheral U-shaped gasket enclosing the peripheral edge of the window pane, a sash frame including detachably mounted and complementally formed L-shaped inner and outer peripherally shaped sections of a size to receive the peripheral edges of said window pane encased in said U-shaped gasket and overlie the marginal portions of the outer face of the window pane, complementally formed detachable securing means for affixing the sash frame to the marginal portions of the wall member defining said window opening, said wall member having a relatively smooth face surrounding the window opening therein, said complementally formed detachable securing means for drawing the sash frame toward the wall member, and an annularly shaped gasket member disposed between the wall member and the sash frame, said annularly shaped gasket member being generally L-shaped in transverse cross-section including a leg comprising a substantially rectangular-shaped body portion, said rectangular-shaped body portion disposed between and adapted to be compressed by the sash frame and wall member, the other leg of said annularly shaped gasket member including an outwardly extending annular projection providing an outer portion, said outer portion being disposed in engagement with and upon compression forming a seal directly between the inner face of the window pane and the marginal face portions of said wall member defining said window opening, said annularly shaped gasket member including a plurality of annular sealing ribs provided on the face opposite the wall member, said annular sealing ribs forming spaced lines of contact with said wall member to effect a multiple seal therebetween, the said outer portion of said annularly shaped gasket member disposed laterally inwardly with respect to the sash frame, said outer portion including a plurality of annular sealing ribs forming spaced lines of contact with said window pane to effect a multiple seal therebetweene, whereby the multiple seal thus formed is visible through the window pane.

4. A window sealing structure for a laboratory glove box comprising a wall member provided with a window opening therein, said window sealing structure including a window pane of a size to overlie the marginal portions of said wall member defining said window opening, a peripheral U-shaped gasket enclosing the peripheral edge of the window pane, a sash frame including detachably mounted and complementally formed L-shaped inner and outer peripherally shaped sections of a size to receive the peripheral edges of said window pane encased in said U-shaped gasket and overlie the marginal portions of the outer face of the window pane, complementally formed detachable securing means for affixing the sash frame to the marginal portions of the wall member defining said window opening, said wall member having a relatively smooth outer face surrounding the window opening therein, said complementally formed detachable securing means for drawing the sash frame toward the wall member, and an annularly shaped gasket member disposed between the wall member and the sash frame, said annularly shaped gasket member being generally L-shaped in transverse cross-section including a leg comprising a substantially rectangular-shaped body portion, said rectangular-shaped body portion disposed between and adapted to be compressed by the sash frame and wall member, the other leg of said annularly shaped gasket member including an outwardly extending annular projection providing an outer portion, said outer portion being disposed in engagement with and upon compression forming a seal directly between the inner face of the window pane and the marginal face portions of said wall member defining said window opening, said outer portion of said outwardly extending annular projection disposed laterally inwardly whereby the engagement of the outer portion of said annularly shaped gasket member with the window pane is disposed laterally inwardly with respect to the sash frame whereby the seal thus formed is visible through the window pane, and said annularly shaped gasket member including three concentric sealing ribs, each concentric sealing rib being engageable with the wall member, one of said concentric sealing ribs being disposed at the inner peripheral edge of said face opposite said wall member and of generally rectangular cross-section, one of the other concentric sealing ribs being respectively disposed adjacent the outer peripheral edge, and the third concentric sealing rib being disposed between the first two concentric sealing ribs, the outer and intermediate concentric sealing ribs having free end portions of generally semi-circular transverse cross-section.

5. A window sealing structure for a laboratory glove box comprising a wall member provided with a window opening therein, said window sealing structure including a window pane of a size to overlie the marginal portion of said wall member defining said window opening, a peripheral U-shaped gasket enclosing the peripheral edge of the window pane, a sash frame including detachably mounted and complementally formed L-shaped inner and outer peripherally shaped sections of a size to receive the peripheral edge of said window pane encased in said U-shaped gasket and overlie the marginal portion of the outer face of the window pane, said wall member having a relatively smooth outer face surrounding the window opening therein, complementally formed detachable securing means for drawing the sash frame toward the wall member, and an annularly shaped gasket member disposed between the wall member and the sash frame, said annularly shaped gasket member being generally L-shaped in transverse cross-section including a leg comprising a substantially rectangular-shaped body portion, said rectangular-shaped body portion disposed between and adapted to be compressed by the sash frame and wall member, the other leg of said annularly shaped gasket member including an outwardly extending annular projection providing an outer portion, said outer portion including a peripheral extending V-shaped groove in the face of said outer portion and opposite the window pane forming a pair of concentric sealing ribs thereon, said outer portion being disposed in engagement with and upon compression forming a seal directly between the inner face of the window pane and the marginal face portion of said wall member defining said window opening, said outer portion of said outwardly extending annular projection disposed laterally inwardly whereby the engagement of the outer portion of said annularly shaped gasket member with the window pane is disposed laterally inwardly with respect to the sash frame whereby the seal of the pair of concentric sealing ribs thus formed is visible through the window pane, and said annularly shaped gasket member including three other concentric sealing ribs, each concentric sealing rib being engageable with the wall member, one of said concentric sealing ribs being disposed at the inner peripheral edge of said face opposite said wall member and of generally rectangular cross-section, one of the other concentric sealing ribs being respectively disposed adjacent the outer peripheral edge, and the third concentric sealing rib being disposed between the first two concentric sealing ribs, the outer and intermediate concentric sealing ribs having free end portions of generally semi-circular transverse cross-section.

6. A window sealing structure for a laboratory glove box comprising a wall member provided with a window opening therein, the edges of said wall member defining said opening having an inwardly directed peripheral flange thereon, said window sealing structure including a window pane of a size to overlie the marginal portions of said wall member defining said opening, a sash frame including an annular channel of a size to receive the peripheral edges of said window pane and overlie the marginal portions of the outer face thereof, a peripheral U-shaped gasket enclosing the peripheral edges of the window pane and disposed within the annular channel, said wall member having a relatively smooth outer face surrounding the window opening therein, said sash frame comprising a pair of opposed annular-shaped members having oppositely directed inwardly extending outer edge walls, a channel member rigidly secured to the annular member forming the outer face of said sash frame, screw means engageable with said channel member and the annular member forming the inner face of said sash frame for rigidly connecting the same, the inner peripheral edges of the annular-shaped members being spaced and defining the aforesaid annular channel in which are disposed the peripheral edges of said window pane encased in said peripheral U-shaped gasket, complementally formed detachable securing means for affixing the sash frame to the marginal portions of the wall member and for drawing the sash frame toward the wall member, and an annularly shaped gasket member disposed between the latter and tthe sash frame, said annularly shaped gasket member being generally L-shaped in transverse cross-section, having one leg thereof disposed between and adapted to be compressed by the sash frame and wall member, the other leg of said annularly shaped gasket member including an outwardly extending annular projection providing an outer annular portion and being disposed inwardly of the inner peripheral edge of the inner annular member in engagement with and upon compression forming a seal directly between the inner face of the window pane and the marginal face portions of said wall member defining said window opening, and said outer annular portion of said outwardly extending annular projection disposed laterally inwardly whereby the engagement of the outer annular portion of said annularly shaped gasket member is disposed laterally inwardly with respect to the sash frame whereby the seal thus formed between the inner face of the window pane and the outer annular portion of said outwardly extending annular projection is visible through the window pane.

7. As an article of manufacture, an extruded gasket member of resilient flexible material for mounting between a sash frame including a window pane and a wall member provided with a window opening therein, said gasket member being generally L-shaped in transverse cross-section including a leg comprising a substantially rectangular-shaped body portion, said rectangular-shaped body portion adapted to be disposed between and to be compressed by the sash frame and wall member, the other leg of said gasket member including an outwardly extending projection providing an outer portion, including a peripheral extending V-shaped groove adapted to be disposed in engagement with and upon compression forming a seal directly between the inner face of the window pane and the marginal face portion of said wall member defining said window opening, and the outer portion of said gasket member adapted for engagement with the window pane being disposed laterally inwardly with respect to the sash frame, said gasket member including a plurality of sealing ribs on the rectangular-shaped body portion for forming spaced lines of contact with said wall member to effect a multiple seal therebetween, and said V-shaped groove in the face of said outer portion providing a pair of sealing ribs thereon for engagement with the window pane, and said outwardly extending projection forming an L-shaped recess with said rectangular-shaped body portion, and said L-shaped recess adapted for mounting the sash frame with the window pane thereof abutting the aforesaid outer portion of the outwardly extending projection.

8. As an article of manufacture, an annularly shaped gasket member formed of resilient and flexible material adapted for positioning between a sash frame including a window pane and a wall member provided with a window opening therein said annularly shaped gasket member being generally L-shaped in transverse cross-section including a leg comprising a substantially rectangular-shaped body portion, said rectangular-shaped body portion adapted to be disposed between and compressed by the sash frame and the wall member, the other leg of said annularly shaped gasket member including an annularly outwardly extending projection providing an annular outer portion, said annular outer portion including a peripheral extending V-shaped groove, said peripheral extending V-shaped groove formed in the face of said annular outer portion adapted for forming a pair of concentric sealing ribs thereon, said annular outer portion adapted to be disposed in engagement with and upon compression forming a seal directly between the inner face of the window pane and the marginal face portion of said wall member defining said window opening, said annularly shaped gasket member including a plurality of other annular sealing ribs provided on the face opposite the wall member, said annular sealing ribs forming spaced lines of contact with said wall member to effect a multiple seal therebetween, said annular outer portion of said annularly shaped gasket member disposed laterally inwardly with respect to the sash frame, said peripheral extending V-shaped groove providing a plurality of annular sealing ribs forming spaced lines of contact with said window pane to effect a multiple seal therebetween, and said outwardly extending annular projection forming with said substantially rectangular-shaped body portion an L-shaped recess being annular in shape and adapted for receiving the sash frame with said annular portion of said outwardly extending annular projection providing a seal between the window pane and the outer annular portion, and the outer annular portion of said annularly shaped gasket member disposed laterally inwardly whereby the engagement of the outer annular portion of said annularly shaped gasket member with the window pane is disposed laterally inwardly with respect to the sash frame whereby the seal of the pair of concentric sealing ribs thus formed is visible through the window pane.

References Cited in the file of this patent
UNITED STATES PATENTS

| | | |
|---|---|---|
| 1,832,847 | Lane | Nov. 24, 1931 |
| 2,099,597 | Carr | Nov. 16, 1937 |
| 2,257,035 | Chaffee | Sept. 23, 1941 |
| 2,548,556 | Ogren | Apr. 10, 1951 |
| 2,691,352 | Bowden | Oct. 12, 1954 |

FOREIGN PATENTS

| | | |
|---|---|---|
| 1,193,404 | France | Apr. 27, 1959 |